United States Patent
Deng et al.

(10) Patent No.: US 10,851,430 B2
(45) Date of Patent: Dec. 1, 2020

(54) FLASH IRONMAKING SYSTEM AND METHOD

(71) Applicant: BEIJING SHANTIE TECHNOLOGY CO., LTD., Beijing (CN)

(72) Inventors: Shuhua Deng, South Australia (AU); Shushan Gong, Beijing (CN)

(73) Assignee: BEIJING SHANTIE TECHNOLOGY CO., LTD., Beijing (CN)

(*) Notice: Subject to any disclaimer, the term of this patent is extended or adjusted under 35 U.S.C. 154(b) by 230 days.

(21) Appl. No.: 15/570,629

(22) PCT Filed: Nov. 25, 2015

(86) PCT No.: PCT/CN2015/095560
§ 371 (c)(1),
(2) Date: Oct. 30, 2017

(87) PCT Pub. No.: WO2016/173248
PCT Pub. Date: Nov. 3, 2016

(65) Prior Publication Data
US 2018/0355448 A1    Dec. 13, 2018

(30) Foreign Application Priority Data

Apr. 30, 2015 (CN) .......................... 2015 1 0213567
Apr. 30, 2015 (CN) ..................... 2015 2 0271206 U

(51) Int. Cl.
*C21B 13/00* (2006.01)
*C21B 11/00* (2006.01)

(52) U.S. Cl.
CPC .......... *C21B 13/0026* (2013.01); *C21B 11/00* (2013.01); *C21B 13/0066* (2013.01);
(Continued)

(58) Field of Classification Search
CPC . C21B 2100/66; C21B 13/143; C21B 13/146; C21B 13/14; C21B 13/10; C21B 13/0066; C21B 13/004; C21B 13/0006
See application file for complete search history.

(56) References Cited

U.S. PATENT DOCUMENTS 8,496,729 B2 *  7/2013  Kang ..................... B01D 47/06
                                                              75/468
2015/0345870 A1   12/2015  Jung et al.

FOREIGN PATENT DOCUMENTS

CN        101463405 A        6/2009
CN        102690919 A        9/2012
(Continued)

OTHER PUBLICATIONS

Hong Yong Sohn, Novel Flash Ironmaking Technology, (Year: 2012).*
(Continued)

*Primary Examiner* — Colleen P Dunn
*Assistant Examiner* — Michael J Kachmarik
(74) *Attorney, Agent, or Firm* — David D. Brush; Westman, Champlin & Koehler, P.A.

(57) ABSTRACT

A flash ironmaking system and a flash ironmaking method are provided. The flash ironmaking system includes a pulverized coal gasifier; a drying pre-reduction kiln; and a flash furnace having a horizontal bottom in which a molten iron layer region, a slag layer region and a carburizing bed layer region are sequentially formed, a reduction tower, a concentrate nozzle, and a flue.

9 Claims, 8 Drawing Sheets

(52) U.S. Cl.
CPC ...... *C21B 13/0073* (2013.01); *C21B 2100/44* (2017.05); *C21B 2100/66* (2017.05)

(56) References Cited

FOREIGN PATENT DOCUMENTS

| CN | 103993115 | A | | 8/2014 |
|---|---|---|---|---|
| CN | 103993116 | A | | 8/2014 |
| CN | 203820824 | U | | 9/2014 |
| CN | 203820825 | U | | 9/2014 |
| CN | 104451015 | A | | 3/2015 |
| CN | 102690919 | B | * | 5/2015 |
| CN | 103993115 | B | * | 2/2018 |
| JP | S56105411 | A | | 8/1981 |
| JP | 2002146420 | A | | 5/2002 |
| JP | 2013023653 | A | | 2/2013 |
| WO | 2014104438 | A1 | | 7/2014 |

OTHER PUBLICATIONS

Joseph Vehec, A novel flash ironmaking process, American Iron and Steel institute University of Utah, (Year: 2014).*
Lee, Gasification of Coal, Handbook of alternative fuel technologies, Taylor & Francis Group, LLC, (Year: 2007).*
European Patent Office Machine Translation CN 102690919 (Year: 2012).*
European Patent Office Machine Translation CN 103993115 (Year: 2014).*
International Search Report dated Feb. 2, 2016 for corresponding International Application No. PCT/CN2015/095560, filed Nov. 25, 2015.
Written Opinion of the International Searching Authority dated Feb. 2, 2016 for corresponding International Application No. PCT/CN2015/095560, filed Nov. 25, 2015.
Office Action and English translation of Office Action, including Search Report, for Japanese Patent Application No. 2018-507761 dated Jul. 8, 2019, 8 pages.
Pinegar et al., Process Simulation and Economic Feasibility Analysis for a Hydrogen-Based Novel Suspension Ironmaking Technology, Department of Metallurgical Engineering, University of Utah, Salt Lake City, Utah 84112, USA (Apr. 2011).
English translation of the Office Action dated Dec. 18, 2018 for Japanese Patent Application No. 2018-507761.

* cited by examiner

FLASH IRONMAKING SYSTEM AND METHOD

CROSS-REFERENCE TO RELATED APPLICATIONS

This application is a Section 371 National Stage Application of International Application No. PCT/CN2015/095560, filed Nov. 25, 2015, published as WO 2016/173248 A1 on Nov. 3, 2016, in English, which claims priority to and benefits of Chinese Patent Application Serial Nos. 201510213567.1 and 201520271206.8, both filed with the State Intellectual Property Office of P. R. China on Apr. 30, 2015, the contents of which are hereby incorporated by reference in their entireties.

FIELD

The present disclosure belongs to the field of ironmaking Specifically, the present disclosure relates to a flash ironmaking system and a flash ironmaking method.

BACKGROUND

A blast furnace is usually used to smelt iron in iron and steel industry. Ironmaking materials are required to be sintered and coke must be used. This leads to long process, low efficiency, high energy consumption, high investment, and especially outstanding environmental issues in the current ironmaking technology. Therefore, there is a need to improve the current ironmaking technology.

SUMMARY

Embodiments of the present disclosure seek to solve at least one of the problems existing in the related art to at least some extent. Therefore, an object of the present disclosure is to provide a flash ironmaking system and a flash ironmaking method. The system may be used to significantly improve the ironmaking efficiency and carry out clean production.

According to an aspect of the present disclosure, a flash ironmaking system is provided. The flash ironmaking system includes a pulverized coal gasifier defining a material inlet and a coal gas outlet, and configured to mix pulverized coal, pure oxygen and steam to obtain a crude coal gas containing carbon monoxide and hydrogen; a drying pre-reduction kiln defining a wet iron ore inlet, a block coal inlet and a charging material outlet, and configured to dry and pre-reduce wet iron ore and block coal to obtain pre-reduced iron ore; and a flash furnace. The flash furnace includes: a horizontal bottom defining a hearth in which a molten iron layer region, a slag layer region and a carburizing bed layer region are sequentially formed from bottom to top, a reduction tower defining a reduction tower chamber therein, and a lower end connected to an upper end of the carburizing bed layer region, a concentrate nozzle provided at a top of the reduction tower, connected to the charging material outlet and the coal gas outlet respectively, and configured to feed the pre-reduced iron ore, the crude coal gas and a fuel containing pure oxygen and pea coal to the reduction furnace chamber to obtain metal iron and a flue gas, a flue defining a lower end connected to the upper end of the carburizing bed layer region.

Therefore, the flash ironmaking system according to an embodiment of the present disclosure may significantly improve the ironmaking efficiency, and the technological process is simple, so that the equipment cost may be significantly lowered.

Furthermore, the flash ironmaking system according to the above embodiment of the present disclosure may further have the following additional technical features.

In some embodiments, the flash furnace further includes: a heat recovery boiler connected to an upper end of the flue and configured to recover heat of a flue gas discharged from the flue; a dynamic wave dust removing unit connected to the heat recovery boiler; and a funnel connected to the dynamic wave dust removing unit. Therefore, it is possible to significantly reduce the environment pollution.

In some embodiments, the flash furnace further includes: an auxiliary fuel nozzle provided at a side wall of the horizontal bottom within the carburizing bed layer region and configured to inject oxygen and auxiliary fuel to the carburizing bed layer region. Therefore, it is possible to significantly improve the ironmaking efficiency.

In some embodiments, the auxiliary fuel is selected from a group consisting of pulverized coal, natural gas, the crude coal gas, and a combination thereof.

In some embodiments, a flue gas vent is formed in a side wall of the flue and communicated with the drying pre-reduction kiln. Therefore, it is possible to significantly improve the thermal energy utilization efficiency.

In some embodiments, the wet iron ore is selected from at least one of iron ore, lateritic-nickel ore and nonferrous metal oxide ore.

According to another aspect of the present disclosure, a flash ironmaking method using a flash ironmaking system is provided. The flash ironmaking system includes: a pulverized coal gasifier defining a material inlet and a coal gas outlet; a drying pre-reduction kiln defining a wet iron ore inlet, a block coal inlet and a charging material outlet; and a flash furnace. The flash furnace includes a horizontal bottom defining a hearth in which a molten iron layer region, a slag layer region and a carburizing bed layer region are sequentially formed from bottom to top, a reduction tower defining a reduction tower chamber, and a lower end connected to an upper end of the carburizing bed layer region, a concentrate nozzle provided at a top of the reduction tower, and connected to the charging material outlet and the coal gas outlet respectively, a flue defining a lower end connected to the upper end of the carburizing bed layer region. The flash ironmaking method includes: mixing pulverized coal, pure oxygen and steam in the pulverized coal gasifier to obtain a crude coal gas containing carbon monoxide and hydrogen; drying and pre-reducing wet iron ore and block coal in the drying pre-reduction kiln to obtain pre-reduced iron ore; feeding the pre-reduced iron ore, the crude coal gas and a fuel containing pure oxygen and pea coal to the reduction tower via the concentrate nozzle to obtain metal iron and a flue gas; discharging the flue gas out of the flash furnace via the flue.

Therefore, the flash ironmaking method according to an embodiment of the present disclosure can significantly improve the ironmaking efficiency and the technological process is simple, so that the equipment cost may be significantly lowered.

Furthermore, the flash ironmaking method according to the above embodiment of the present may further have the following additional technical features.

In some embodiments, the flash furnace further includes a heat recovery boiler connected to an upper end of the flue; a dynamic wave dust removing unit connected to the heat recovery boiler; and a funnel connected to the dynamic wave dust removing unit, and the method further includes: feeding the flue gas discharged from the flue to the heat recovery boiler to recover waste heat of the flue gas; feeding the flue gas from the heat recovery boiler to the dynamic wave dust removing unit to remove dust from the flue gas; and discharging the flue gas from the dynamic wave dust removing unit out of the flash furnace via the funnel. Thus, it is possible to significantly reduce the environment pollution.

In some embodiments, the flash furnace further includes an auxiliary fuel nozzle provided at a side wall of the horizontal bottom within the carburizing bed layer region, and the method further includes: injecting oxygen and auxiliary fuel to the carburizing bed layer region via the auxiliary fuel nozzle. Thus, it is possible to significantly improve the ironmaking efficiency.

In some embodiments, the auxiliary fuel is selected from a group consisting of pulverized coal, natural gas, the crude coal gas, and a combination thereof.

In some embodiments, a flue gas vent is formed in a side wall of the flue and communicated with the drying pre-reduction kiln, and the method further includes: feeding a part of flue gas in the flue to the drying pre-reduction kiln via the flue gas vent. Thus, it is possible to significantly improve the thermal energy utilization efficiency.

In some embodiments, the wet iron ore is selected from at least one of iron ore, lateritic-nickel ore and nonferrous metal oxide ore.

In some embodiments, feeding the pre-reduced iron ore, the crude coal gas and the fuel containing pure oxygen and pea coal to the reduction tower via the concentrate nozzle to obtain metal iron and the flue gas includes: reacting high valence iron oxides of the pre-reduced iron ore with carbon monoxide and/or hydrogen of the crude coal gas at a temperature of 1300° C. to obtain metal iron.

Additional aspects and advantages of an embodiment of present disclosure will be given in part in the following descriptions, become apparent in part from the following descriptions, or be learned from the practice of the an embodiment of the present disclosure.

BRIEF DESCRIPTION OF THE DRAWINGS

These and other aspects and advantages of an embodiment of the present disclosure will become apparent and more readily appreciated from the following descriptions made with reference to the drawings, in which.

DETAILED DESCRIPTION

Figure 1:
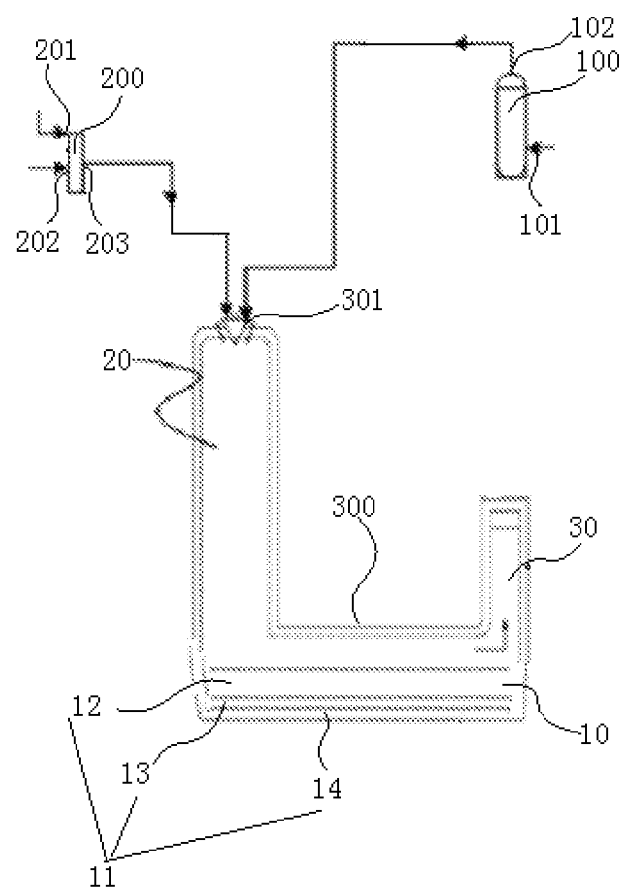
FIG. 1 is a schematic diagram of a flash ironmaking system according to an embodiment of the present disclosure.

Reference will be made in detail to an embodiment of the present disclosure. The examples of an embodiment described herein are shown in the drawings. The same or similar symbols therein are presented for the same or similar elements or the elements having same or similar functions from the beginning to the end. The embodiment described herein with reference to drawings are explanatory, illustrative, and used to generally understand the present disclosure. The embodiment shall not be construed to limit the present disclosure.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise", "axial", "radial", "circumference" should be construed to refer to the orientation or position relationship as then described or as shown in the drawings under discussion. These relative terms are for convenience of description and do not require that the present invention be constructed or operated in a particular orientation. Therefore, this shall not be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present invention, "a plurality of" means two or more than two, e.g. three, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, unless specified otherwise. The specific meanings of the terms above can be understood by those skilled in the art according to specific situations in the present disclosure.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

According to an aspect of the present disclosure, a flash ironmaking system is provided. The flash ironmaking system according to embodiments of the present disclosure will be specifically described with reference to FIG. 1 below. According to embodiments of the present disclosure, the flash ironmaking system includes a pulverized coal gasifier 100, a drying pre-reduction kiln 200 and a flash furnace 300.

The pulverized coal gasifier 100 has a material inlet 101 and a coal gas outlet 102, and is configured to mix pulverized coal, pure oxygen and steam to obtain a crude coal gas containing carbon monoxide and hydrogen. It should be noted that the pulverized coal gasifier 100 can be any conventional device for subjecting pulverized coal to gasification to obtain a coal gas.

In some embodiments, the drying pre-reduction kiln 200 has a wet iron ore inlet 201, a block coal inlet 202 and a charging material outlet 203, and is configured to dry and pre-reduce wet iron ore and block coal to obtain pre-reduced iron ore.

In some embodiments, the specific type of the wet iron ore is not limited, and can be chosen based on the actual situation by those skilled in the art. In some embodiments, the wet iron ore is selected from at least one of iron ore, lateritic-nickel ore and nonferrous metal oxide ore.

The flash furnace 300 includes a horizontal bottom 10, a reduction tower 20, a concentrate nozzle 301 and a flue 30. In a specific embodiment, the horizontal bottom 10 defines a hearth 11 in which a molten iron layer region 14, a slag layer region 13 and a carburizing bed layer region 12 are sequentially formed from bottom to top. The reduction tower 20 defines a reduction tower chamber 21 therein, and a lower end of the reduction tower 20 is connected to an upper end of the carburizing bed layer region 12. The concentrate nozzle 301 is provided at a top of the reduction tower 20, connected to the charging material outlet 203 and the coal gas outlet 102 respectively, and configured to feed the pre-reduced iron ore, the crude coal gas and a fuel containing pure oxygen and pea coal to the reduction furnace chamber 21 to obtain metal iron and a flue gas. A lower end of the flue 30 is connected to the upper end of the carburizing bed layer region 12 of the horizontal bottom 10. Specifically, the pre-reduced iron ore, the crude coal gas and the fuel containing pure oxygen and pea coal are fed to the reduction tower chamber 21 via the concentrate nozzle 301. A reduction reaction happens rapidly between the high valence iron oxides of the iron ore in a floating state and carbon monoxide and/or hydrogen of the crude coal gas at 1300° C., resulting in metal iron and a small amount of low valence iron oxide falling to the hearth 11 of the horizontal bottom 10. Because of the differences in specific gravity, a molten iron layer region 14, a slag layer region 13 and a carburizing bed layer region 12 are sequentially formed from bottom to top in the hearth 11, in which the carburizing bed layer region 12 may be formed from pulverized coal and coke. The flue gas produced in the reduction process can be discharged out of the flash furnace 300 via the flue 30.

In some embodiments, the reduction tower 20 can be cylindrical with an inner diameter of 7.0 to 10.0 m and a height of 5.5 to 7.0 m. The materials of the lining of the reduction tower 20 may be water-cooled high alumina bricks or water-cooled uncertainty refractory materials.

The inventors have found that the coal gas made by the gasifier may contact and react with the pre-reduced iron ore in the flash furnace. The iron ore is in a floating state in the reduction tower of the flash furnace so as to increase the contact area between the high valence iron oxides of the iron ore and the carbon monoxide or/and hydrogen of coal gas, such that the reaction between the high valence iron oxides of the iron ore and the reducing agent happens rapidly to produce metal iron so as to improve the ironmaking efficiency. Moreover, the structure of the flash ironmaking system is simple, so that the equipment cost may be significantly lowered.

Figure 2:
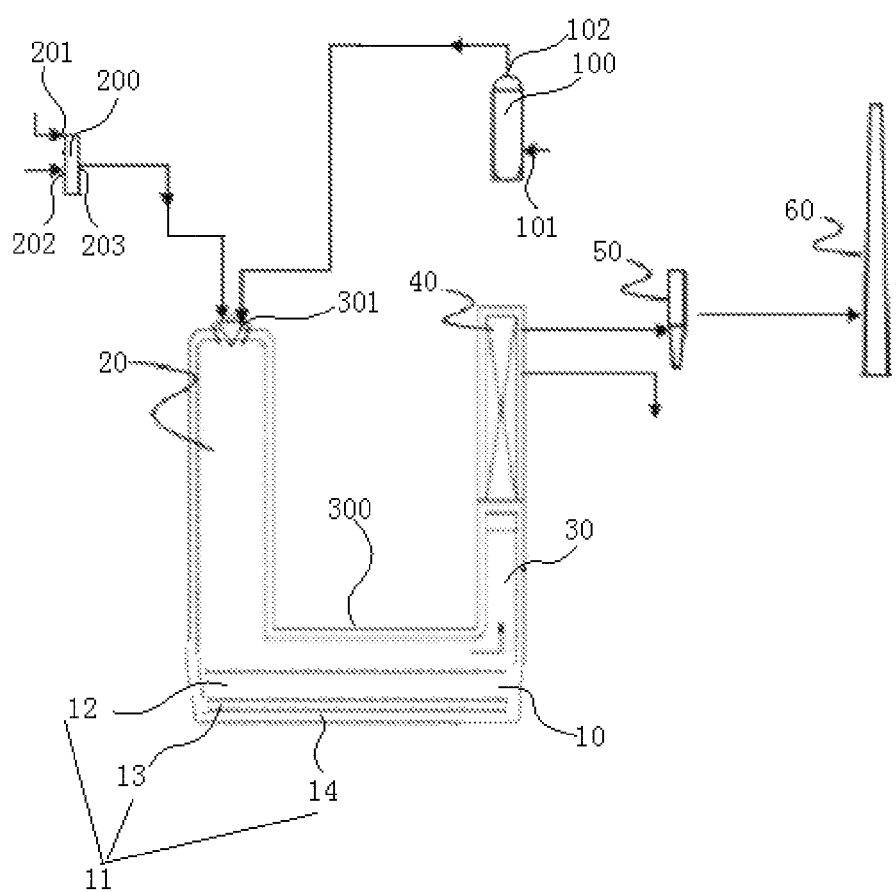
FIG. 2 is a schematic diagram of a flash ironmaking system according to another embodiment of the present disclosure.

According to an embodiment of the present disclosure, referring to FIG. 2, the flash furnace 300 further includes a heat recovery boiler 40, a dynamic wave dust removing unit 50 and a funnel 60.

In a specific embodiment, the heat recovery boiler 40 is connected to an upper end of the flue 30 and configured to recover heat of a flue gas discharged from the flue 30. Specifically, the heat recovery boiler 40 may be used to reduce the temperature of the flue gas from 1300° C. to 150° C. Thus, the heat recovery boiler may be used to recycle the heat from the flue gas, and the steam generated after absorbing heat can be used in power generation, thus improving the heat utilization efficiency. The heat recovery boiler can recover dust in the flue gas at the same time, so that it is possible to achieve the goal of flue gas clarification to carry out clean production.

In a specific embodiment, the dynamic wave dust removing unit 50 is connected to the heat recovery boiler 40 so as to remove dust particles from the flue gas, which can clean the flue gas to carry out further clean production.

In a specific embodiment, the funnel 60 is connected to the dynamic wave dust removing unit 40. Thus, the resulting clean flue gas can be discharged into the atmosphere.

Figure 3:
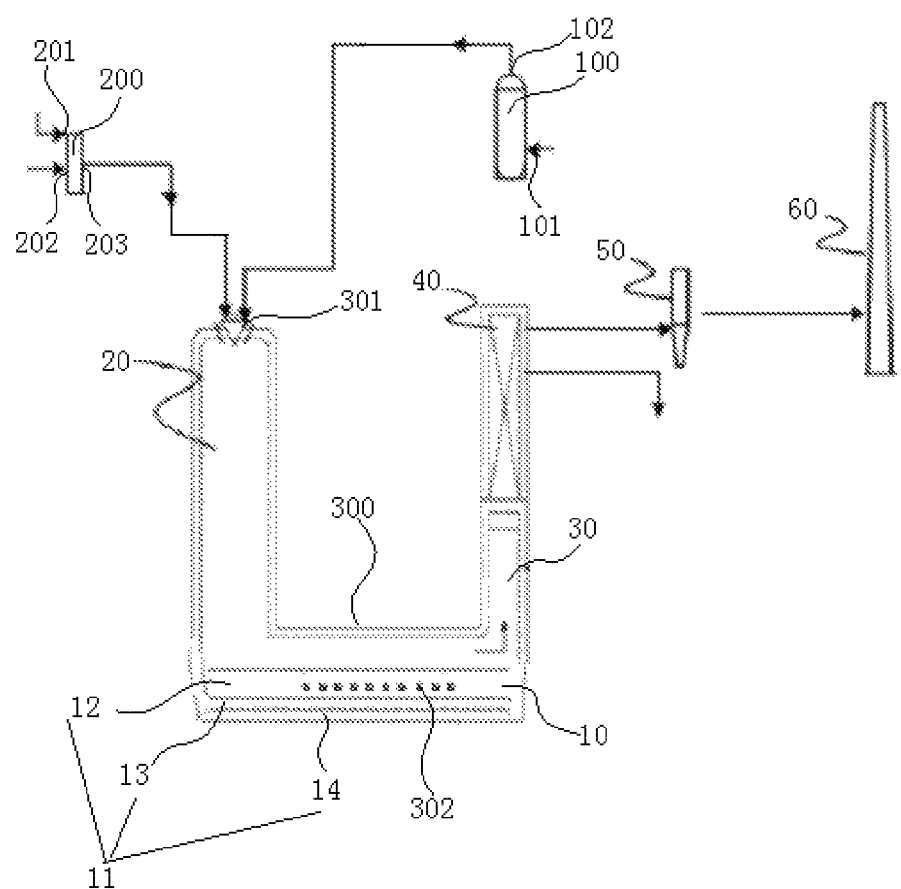
FIG. 3 is a schematic diagram of a flash ironmaking system according to a further embodiment of the present disclosure.

Referring to FIG. 3, in some embodiments, the flash furnace 300 further includes an auxiliary fuel nozzle 302. In a specific embodiment, the auxiliary fuel nozzle 302 is provided at a side wall of the horizontal bottom 10 within the carburizing bed layer region 12 and configured to inject oxygen and auxiliary fuel to the carburizing bed layer region 12 of the horizontal bottom 10, which can increase the temperature of the hearth significantly. On the one hand, the separation efficiency between the iron metal and the reduction tailings can be significantly improved; on the other hand, carbon atoms may permeate into the surface layer of molten iron easily, thereby increasing the hardness of the resulting pig iron. In an embodiment, the specific type of auxiliary fuel is not particularly limited. Those skilled in the art can choose the specific type of the auxiliary fuel based on the actual situation. In some embodiments, the auxiliary fuel may be selected from a group consisting of pulverized coal, natural gas, the crude coal gas obtained in the pulverized coal gasifier, and a combination thereof.

Figure 4:
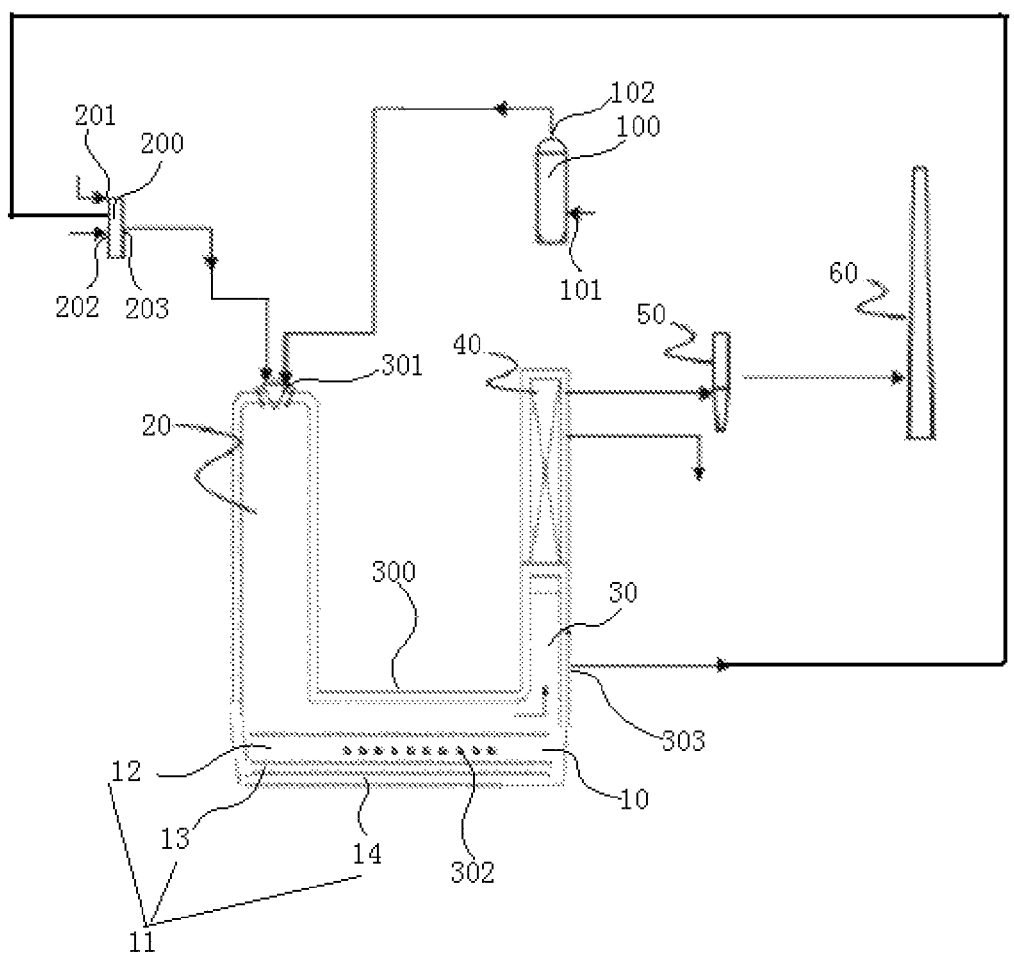
FIG. 4 is a schematic diagram of a flash ironmaking system according to still another embodiment of the present disclosure.

Referring to FIG. 4, in some embodiments, a flue gas vent 303 is formed in a side wall of the flue 30 and communicated with the drying pre-reduction kiln 200, and configured to feed a part of high temperature flue gas in the flue to the drying pre-reduction kiln, so that the wet iron ore may be dried and pre-reduced using high temperature flue gas as a heat source of the drying pre-reduction kiln. Thus, the flue gas is supplied to the drying pre-reduction kiln so as to significantly improve the utilization rate of the flue gas, thereby significantly reducing the investment of energy consumption, and significantly reducing the cost of ironmaking.

Figure 5:
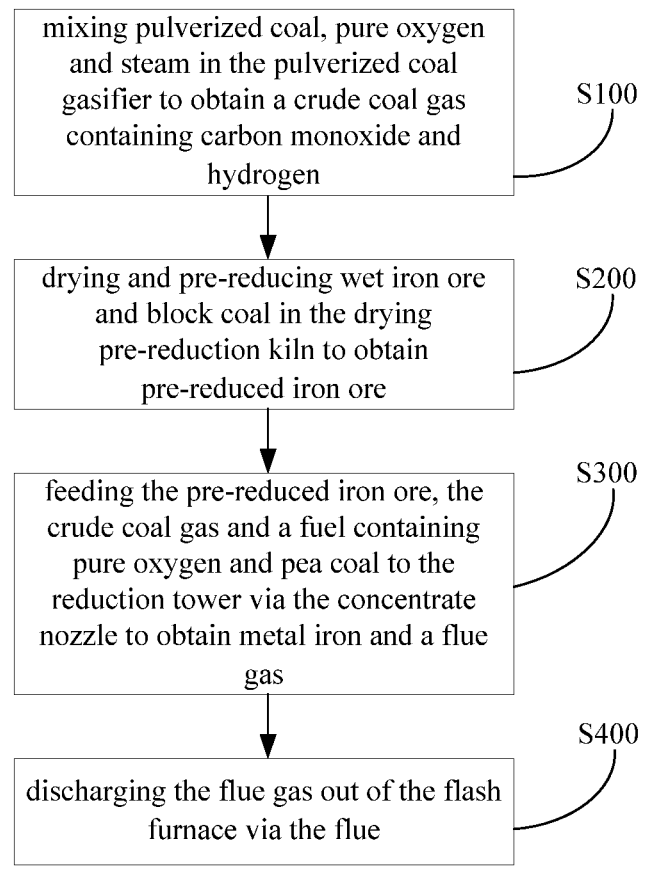
FIG. 5 is a flow chart of a flash ironmaking method according to an embodiment of the present disclosure.

In a second aspect of the present disclosure, a flash ironmaking method is provided. According to an embodiment of the present disclosure, the method is performed by using the flash ironmaking system described above. The flash ironmaking method according to an embodiment of the present disclosure will be described specifically with reference to FIG. 5. According to an embodiment of the present disclosure, the method includes:

S100: mixing pulverized coal, pure oxygen and steam in the pulverized coal gasifier to obtain a crude coal gas containing carbon monoxide and hydrogen;

S200: drying and pre-reducing wet iron ore and block coal in the drying pre-reduction kiln to obtain pre-reduced iron ore;

S300: feeding the pre-reduced iron ore, the crude coal gas and a fuel containing pure oxygen and pea coal to the reduction tower via the concentrate nozzle to obtain metal iron and a flue gas;

S400: discharging the flue gas out of the flash furnace via the flue.

The inventors have found that the coal gas made by the gasifier may contact and react with the pre-reduced iron ore in the flash furnace. The iron ore is in a floating state in the reduction tower of the flash furnace so as to increase the contact area between the high valence iron oxides of the iron ore and the carbon monoxide or/and hydrogen of coal gas, such that the reaction between the high valence iron oxides of the iron ore and the reducing agent happens rapidly to produce metal iron so as to improve the ironmaking efficiency. Moreover, the smelting process is simple, so that the equipment cost may be significantly lowered.

Figure 6:
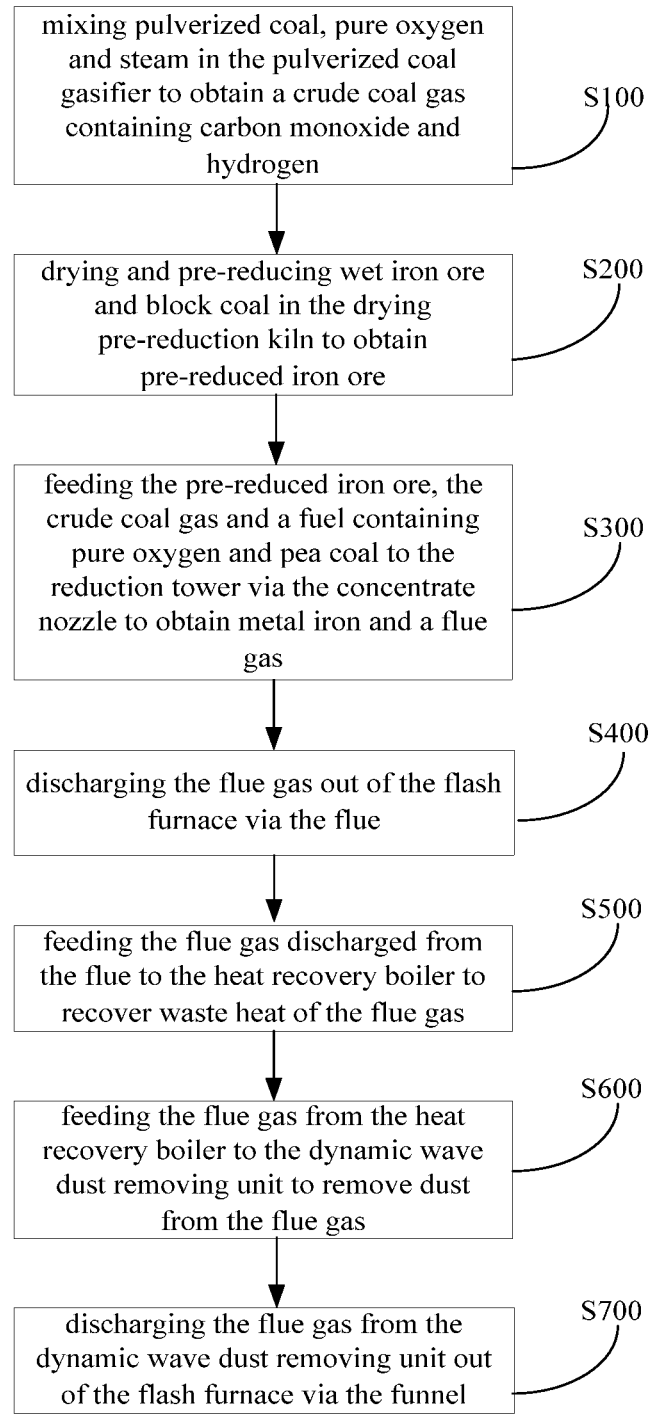
FIG. 6 is a flow chart of a flash ironmaking method according to another embodiment of the present disclosure.

In some embodiments, with reference to FIG. 6, the flash ironmaking method further includes:

S500: feeding the flue gas discharged from the flue to the heat recovery boiler to recover waste heat of the flue gas;

S600: feeding the flue gas from the heat recovery boiler to the dynamic wave dust removing unit to remove dust from the flue gas;

S700: discharging the flue gas from the dynamic wave dust removing unit out of the flash furnace via the funnel.

Figure 7:
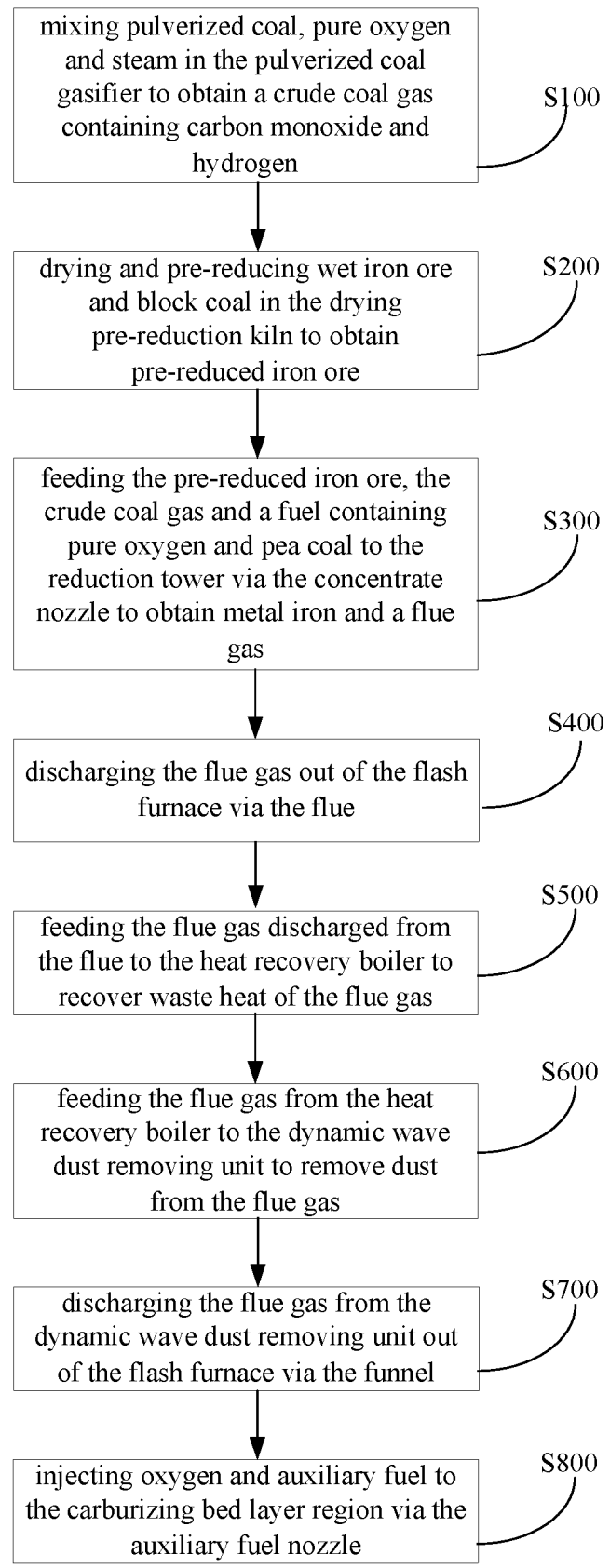
FIG. 7 is a flow chart of a flash ironmaking method according to a further embodiment of the present disclosure.

In some embodiments, with reference to FIG. 7, the flash ironmaking method further includes:

S800: injecting oxygen and auxiliary fuel to the carburizing bed layer region via the auxiliary fuel nozzle.

Figure 8:
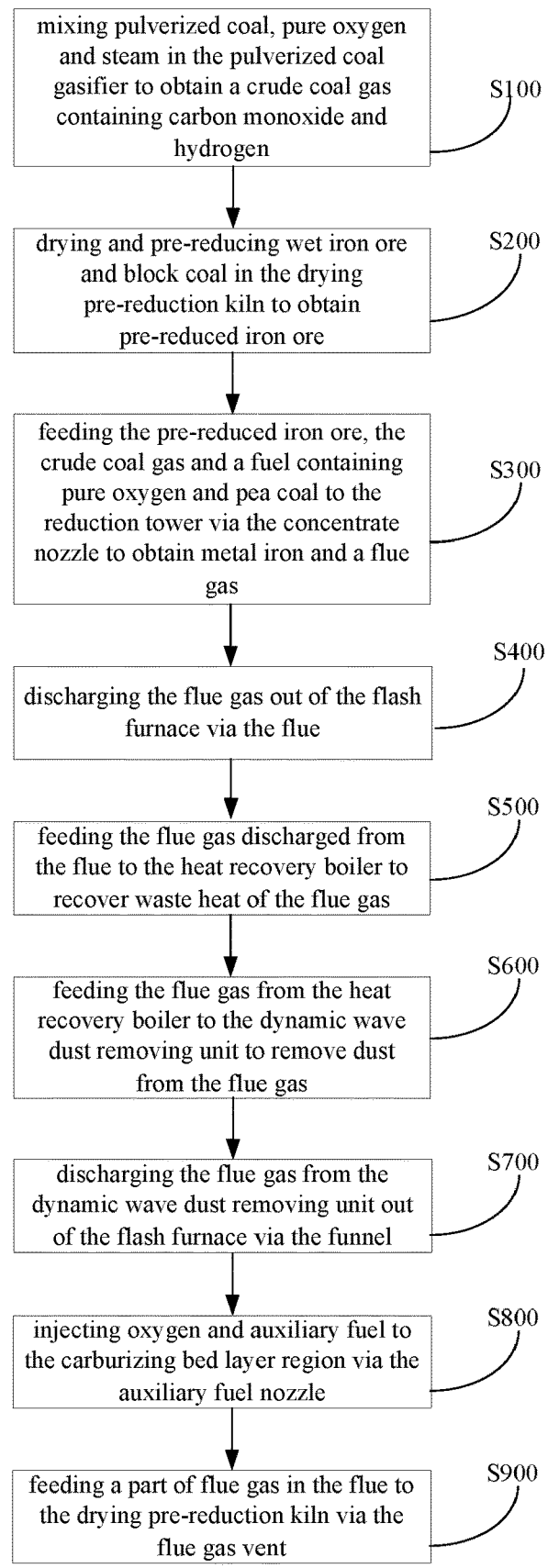
FIG. 8 is a flow chart of a flash ironmaking method according to still another embodiment of the present disclosure.

In some embodiments, with reference to FIG. 8, the flash ironmaking method further includes:

S900: feeding a part of flue gas in the flue to the drying pre-reduction kiln via the flue gas vent.

Specifically, the pulverized coal, pure oxygen and steam are first mixed in the pulverized coal gasifier so as to obtain crude coal gas containing carbon monoxide and hydrogen. Wet iron ore and block coal are dried and pre-reduced in the drying pre-reduction kiln so as to obtain pre-reduced iron ore, and then the pre-reduced iron ore, the crude coal gas and the fuel containing pure oxygen and pea coal are fed to the reduction tower chamber of the flash furnace via the concentrate nozzle. A reduction reaction happens rapidly between the high valence iron oxides of the iron ore in a floating state and carbon monoxide or/and hydrogen of the crude coal gas at 1300° C., resulting in metal iron and a small amount of low valence iron oxide falling to the hearth of the horizontal bottom. Because of the differences in specific gravity, a molten iron layer region, a slag layer region and a carburizing bed layer region are sequentially formed from bottom to top in the hearth, and at the same time, oxygen and auxiliary fuel are injected to the carburizing bed layer region via the auxiliary fuel nozzle provided at the side wall of the horizontal bottom within the carburizing bed layer region so as to increase the temperature of the hearth. Meanwhile, the flue gas produced in the reduction reaction is directed from the flue to the heat recovery boiler for the waste heat recovery and dust removal, such that the temperature of the flue gas can be reduced from 1300° C. to 150° C., and the dust in the flue gas may be significantly reduced. Then, the flue gas is provided to the dynamic wave dust removing unit so as to further remove dust from the flue gas. The resulting clean flue gas is discharged into the atmosphere via the funnel. In addition, the high temperature flue gas produced during the reduction reaction is fed to the drying pre-reduction kiln via the flue gas vent so as to reduce the energy consumption of the system significantly.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more an embodiment or examples. Furthermore, in no conflicting conditions, the features of different an embodiment or examples can be composited or combined with different an embodiment or examples of the specification by the skilled in the art.

Although explanatory an embodiment have been shown and described, it would be appreciated by those skilled in the art that the above an embodiment cannot be construed to limit the present disclosure, and changes, alternatives, and modifications can be made in the an embodiment without departing from spirit, principles and scope of the present disclosure.

What is claimed is:

1. A flash ironmaking system, comprising:
   a pulverized coal gasifier defining a material inlet and a coal gas outlet, and configured to mix pulverized coal, pure oxygen and steam to obtain a crude coal gas containing carbon monoxide and hydrogen;
   a drying pre-reduction kiln defining a wet iron ore inlet, a block coal inlet and a charging material outlet, and configured to dry and pre-reduce wet iron ore and block coal to obtain pre-reduced iron ore; and
   a flash furnace comprising:
   a horizontal bottom defining a hearth in which a molten iron layer region, a slag layer region and a carburizing bed layer region are sequentially formed from bottom to top,
   a reduction tower defining a reduction tower chamber therein, and a lower end connected to an upper end of the carburizing bed layer region,
   a concentrate nozzle provided at a top of the reduction tower, connected to the charging material outlet and the coal gas outlet respectively, and configured to only feed the pre-reduced iron ore, the crude coal gas and a fuel containing pure oxygen and pea coal to the reduction tower chamber to obtain metal iron and a flue gas,
   a flue defining a lower end connected to the upper end of the carbonizing bed layer region, wherein a flue gas vent is formed in a side wall of the flue and communicated with the drying pre-reduction kiln.

2. The system according to claim 1, wherein the flash furnace further comprises:
   a heat recovery boiler connected to an upper end of the flue and configured to recover heat of a flue gas discharged from the flue;
   a dynamic wave dust removing unit configured to remove dust from the flue gas and connected to the heat recovery boiler; and a funnel connected to the dynamic wave dust removing unit.

3. The system according to claim 1, wherein the flash furnace further comprises:
an auxiliary fuel nozzle provided at a side wall of the horizontal bottom within the carburizing bed layer region and configured to inject oxygen and auxiliary fuel to the carburizing bed layer region.

4. The system according to claim 3, wherein the auxiliary fuel is selected from a group consisting of pulverized coal, natural gas, the crude coal gas, and a combination thereof.

5. The system according to claim 1, wherein the wet iron ore is selected from at least one of iron ore and lateritic-nickel ore.

6. The system according to claim 1, wherein the reduction tower is a cylinder with an inner diameter of 7.0 to 10.0 meters and a height of 5.5 to 7.0 meters.

7. The system according to claim 1, wherein lining of the reduction tower is made of water-cooled high alumina bricks or water-cooled uncertainty refractory materials.

8. The system according to claim 1, wherein the flue gas has a temperature of more than 1300° C.

9. The system according to claim 2, wherein the heat recovery boiler is configured to reduce the temperature of the flue gas from 1300° C. to 150° C.

\* \* \* \* \*